(12) United States Patent
Miyashita

(10) Patent No.: US 6,848,801 B2
(45) Date of Patent: Feb. 1, 2005

(54) LIGHTING PANEL FOR A DISPLAY ASSEMBLY

(75) Inventor: Junji Miyashita, Yamanashi-ken (JP)

(73) Assignee: Citizen Electronics Co., Ltd., Yamanashi-ken (JP)

( * ) Notice: Subject to any disclaimer, the term of this patent is extended or adjusted under 35 U.S.C. 154(b) by 74 days.

(21) Appl. No.: 10/336,752

(22) Filed: Jan. 6, 2003

(65) Prior Publication Data

US 2003/0137823 A1 Jul. 24, 2003

(30) Foreign Application Priority Data

Jan. 18, 2002 (JP) ......................................... 2002-010878

(51) Int. Cl.[7] .............................................. F21V 7/04

(52) U.S. Cl. ............................. 362/31; 362/27; 362/558

(58) Field of Search .......................... 362/31, 558, 561, 362/27; 349/65, 69

(56) References Cited

U.S. PATENT DOCUMENTS

| | | | | |
|---|---|---|---|---|
| 3,752,974 A | * | 8/1973 | Baker et al. .................. 362/31 |
| 4,673,254 A | * | 6/1987 | Kato et al. .................. 359/599 |
| 6,079,838 A | * | 6/2000 | Parker et al. ................. 362/31 |
| 6,530,670 B2 | * | 3/2003 | Hirayama ..................... 362/31 |
| 6,601,962 B1 | * | 8/2003 | Ehara et al. .................. 362/31 |
| 6,671,013 B1 | * | 12/2003 | Ohkawa ...................... 349/62 |
| 2002/0089839 A1 | * | 7/2002 | Chien et al. .................. 362/31 |

* cited by examiner

*Primary Examiner*—Thomas M. Sember
*Assistant Examiner*—Jacob Y. Choi
(74) *Attorney, Agent, or Firm*—Birch, Stewart, Kolasch & Birch, LLP

(57) ABSTRACT

A plurality of light sources are provided at a front side of a lighting panel made of a transparent resin. The lighting panel has a light discharge side, and a reflection side opposite to the light discharge side. A plurality of refracting recesses are formed in the front side disposed to receive light emitted from the light source. The refracting recess has a sectional shape so as to cause the light to refract close to the front side in the lighting panel.

5 Claims, 8 Drawing Sheets

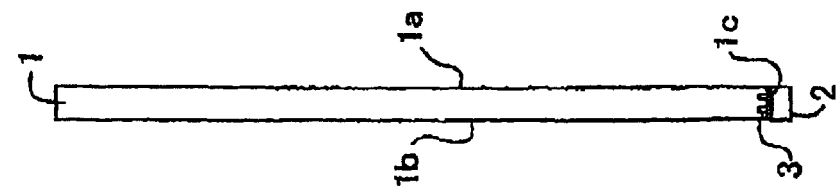
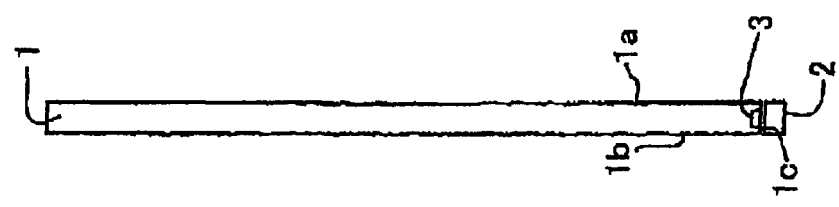
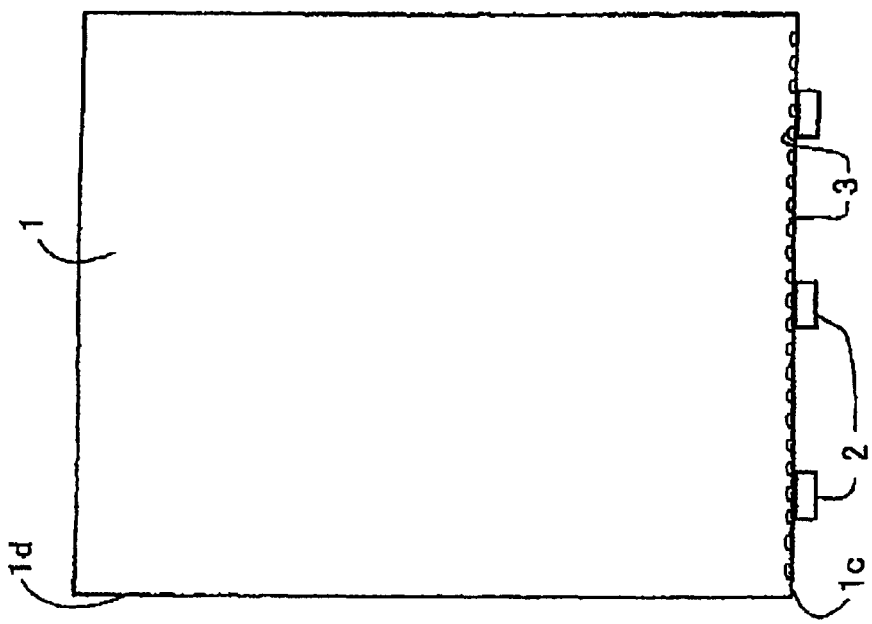

LIGHTING PANEL FOR A DISPLAY ASSEMBLY

This nonprovisional application claims priority under 35 U.S.C. §119(a) on Patent Application No. 2002-10878 filed in JAPAN on Jan. 18, 2002, which is herein incorporated by reference.

BACKGROUND OF THE INVENTION

The present invention relates to a lighting panel for lighting a display panel such as a liquid crystal display (LCD) from behind.

As a light source, an edge light is used for introducing light from an edge of the lighting panel. In order to provide a uniform light-beam, a plurality of edge lights must be used. However, if the light emitting diode (LED) is used as an edge light, the number of the LEDs causes increase of the cost.

FIG. 8 is a perspective view showing a conventional lighting panel of a display assembly, FIG. 9 is an enlarged side view thereof, FIG. 10 is a plan view, and FIG. 11 is a side view.

The display assembly comprises a lighting panel 101, three LEDs 102 as edge lights disposed at a front side 101c of the lighting panel, and an LCD 107 disposed above the lighting panel 101.

The lighting panel 101 is made of a transparent resin and has a light discharge side 101a and a light reflecting side 101b. There is formed a plurality of grooves 101d on the light reflecting side 101b. Each of the grooves 101d has a triangular sectional shape.

Light s2 emitted from the LEDs 102 enters the lighting panel 101 through the front side 101c. The light s in the lighting panel is reflected by the inside inclined surface of the groove 101d on the light reflecting side 101b and discharged from the light discharge side 101a. The discharged light 105 illuminates the underside of the LCD 107.

FIG. 12 is a plan view of the lighting panel 101 for showing distribution of light in the lighting panel, and FIG. 13 is an enlarged plan view of the lighting panel, FIG. 14 is a side view of the lighting panel, and FIG. 15 is an enlarged side view of the lighting panel.

As shown in FIGS. 12, 14 and 15, light rays s are widely distributed in the lighting panel 101. However, since an inclination angle El between the outermost light ray s1 and the front side 101c is comparatively large which is about 60°, there is formed large ineffective areas R and R1, from which light rays are not discharged from the lighting panel. As a result, the LCD 107 is not uniformly illuminated.

SUMMARY OF THE INVENTION

An object of the present invention is to provide a lighting panel which may uniformly illuminate a display panel.

According to the present invention, there is provided a display assembly comprising at least one light source, a lighting panel made of a transparent resin, the lighting panel having a front side adjacent the light source, a light discharge side, and a reflection side opposite to the light discharge side, at least one refracting recess formed in the front side disposed to receive light emitted from the light source, the refracting recess having a sectional shape so as to cause the light to refract close to the front side in the lighting panel.

The light source is provided to radially emit the light in a horizontal direction and a vertical direction.

Furthermore the recess has walls perpendicular to the light discharge side and upper and lower walls parallel to the light discharge side.

The walls perpendicular to the light discharge side comprise an innermost wall, left and right arcuated walls adjacent the innermost wall, and left and right side walls adjacent arcuated walls.

These and other objects and features of the present invention will become more apparent from the following detailed description with reference to the accompanying drawings.

BRIEF DESCRIPTION OF DRAWINGS

FIG. 3a is a plan view;

FIGS. 3b and 3c are side views;

DETAILED DESCRIPTION OF THE PREFERRED EMBODIMENT

Figure 1:
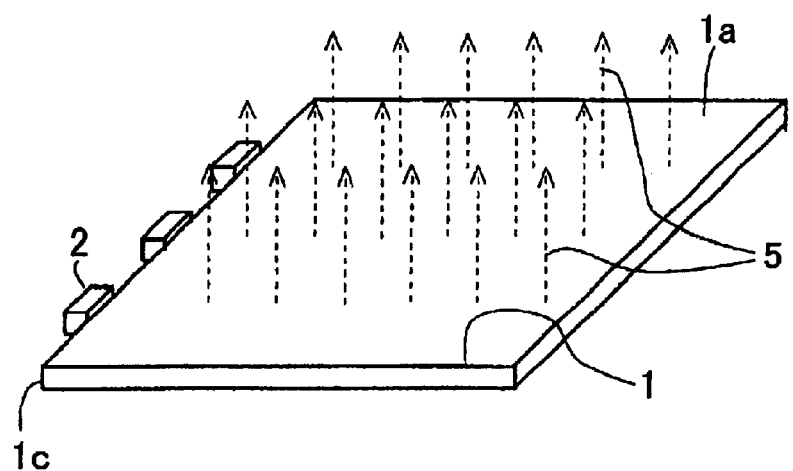
FIG. 1 is a perspective view showing a lighting panel of a display assembly according to the present invention.
Figure 2:
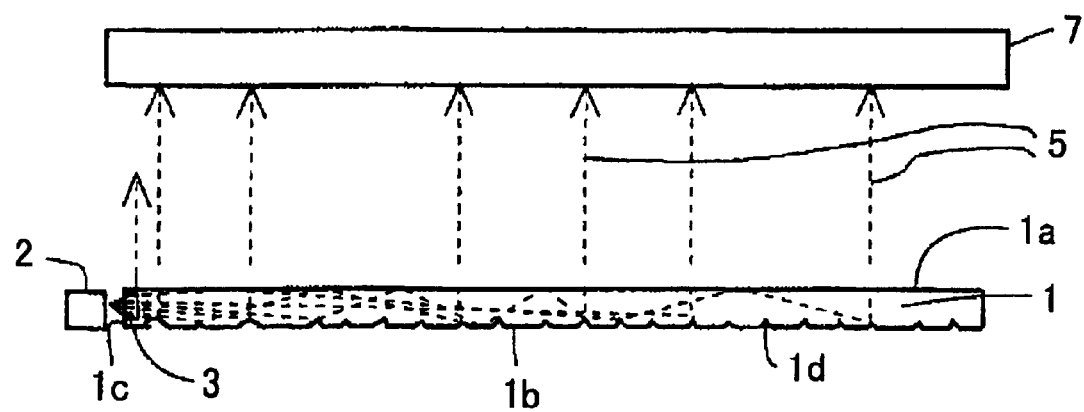
FIG. 2 is an enlarged side view.

FIG. 1 is a perspective view showing a lighting panel of a display assembly according to an embodiment of the present invention, FIG. 2 is an enlarged side view of the lighting panel, FIG. 3a is a plan view, and FIGS. 3b and 3c are side views. FIG. 3c shows a modification of an LED.

The display assembly comprises a lighting panel 1, three LED devices 2 as edge lights disposed in front of a front side 1c of the lighting panel, and an LCD 7 disposed above the lighting panel 1.

The lighting panel 1 is made of a transparent resin and has a thin thickness and a wide rectangular shape in plan view, having a light discharge side 1a and a light reflecting side 1b. There is formed a plurality of grooves 1d on the light reflecting side 1b. Each of the grooves 1d has a triangular sectional shape.

There is provided a plurality of refracting recesses 3 in the front side 1c arranged on a straight line in the lateral direction in order to variously refract light rays entering the lighting panel 1.

Figure 4:
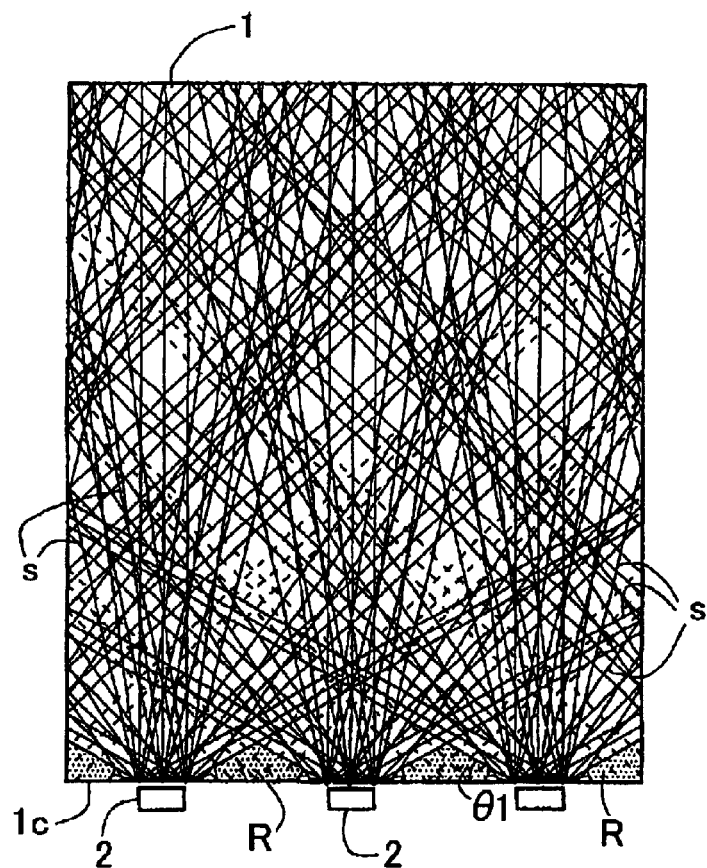
FIG. 4 is a plan view of the lighting panel.
Figure 5:
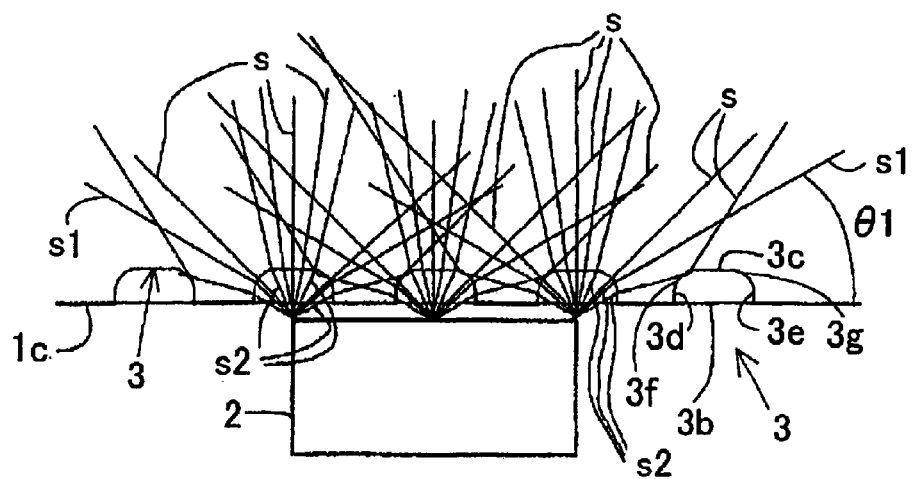
FIG. 5 is an enlarged plan view of a part of the lighting panel.
Figure 6:
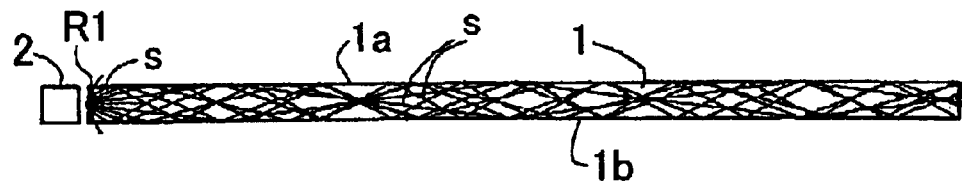
FIG. 6 is a side view of the lighting panel.
Figure 7:
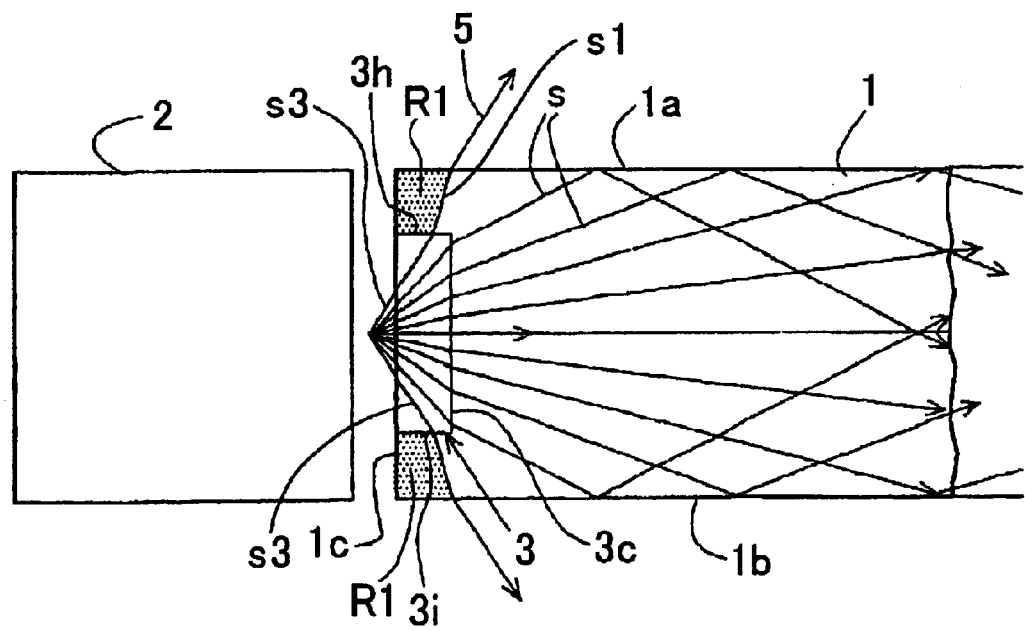
FIG. 7 is an enlarged side view of a part of the lighting panel.
Figure 8:
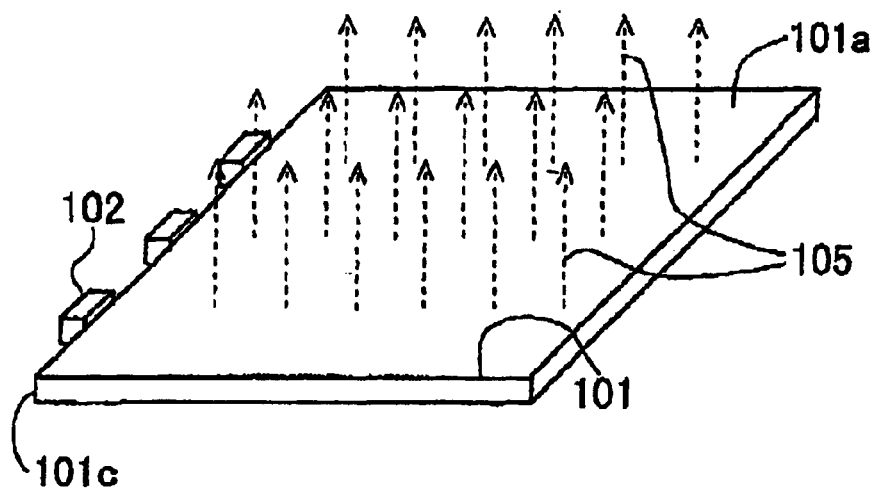
FIG. 8 is a perspective view showing a conventional lighting panel of a display assembly.
Figure 9:
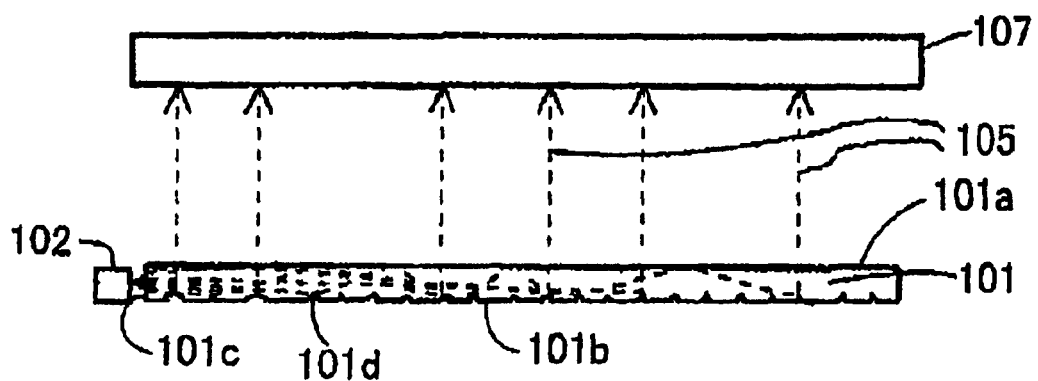
FIG. 9 is an enlarged side view.
Figure 10:
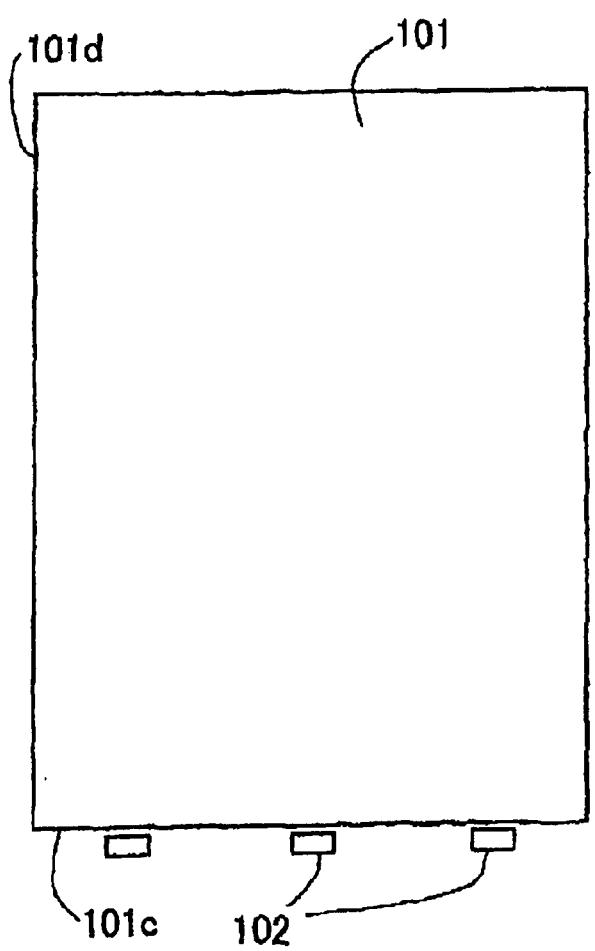
FIG. 10 is a plan view.
Figure 11:
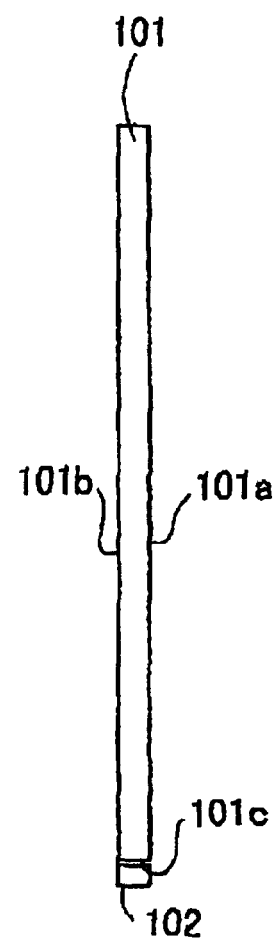
FIG. 11 is a side view.

FIG. 4 is a plan view of the lighting panel 1 for showing distribution of light in the lighting panel, and FIG. 5 is an enlarged plan view of a part of the lighting panel, FIG. 6 is a side-view of the lighting panel, and FIG. 7 is an enlarged side view of the lighting panel.

As shown in FIG. 5, each of the refracting recesses 3 has a horizontal sectional shape comprising an opening 3b having a rectangular shape, an innermost wall 3c, a left side wall 3d, a right side wall 3e, a left arcuated wall 3f between the left side wall 3d and the innermost wall 3c, and a right arcuated wall 3g between the right side wall 3e and the innermost wall 3c. Each of the walls 3c, 3d, 3e, 3f and 3g is perpendicular to the light discharge side 1a. Furthermore, as shown in FIG. 7, the recess 3 has a vertical sectional shape comprising an upper flat wall 3h and a lower flat wall 3i, which are parallel to the light discharge side 1a.

As shown in FIG. 5, each of the LED devices 2 has three LEDs. Each of the LED is disposed so that light emitted from the LED strikes the inside wall of the corresponding refracting recess 3. The LED radially emits light in the horizontal direction and the vertical direction as shown in FIGS. 5 and 7.

Light s2 emitted from the LED devices 2 enters the lighting panel 1 through the refracting recesses 3. The light s in the lighting panel is reflected by the inside inclined surface of the groove 1d on the light reflecting side 1b and discharged from the light discharge side 1a. The discharged light 5 illuminates the underside of the LCD 7.

Figure 12:
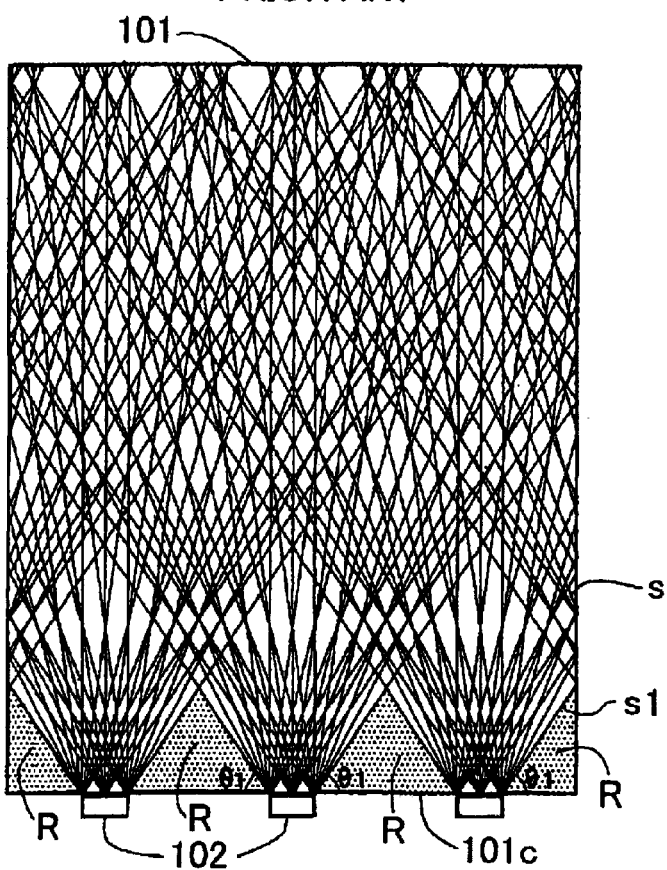
FIG. 12 is a plan view of the lighting panel.
Figure 13:
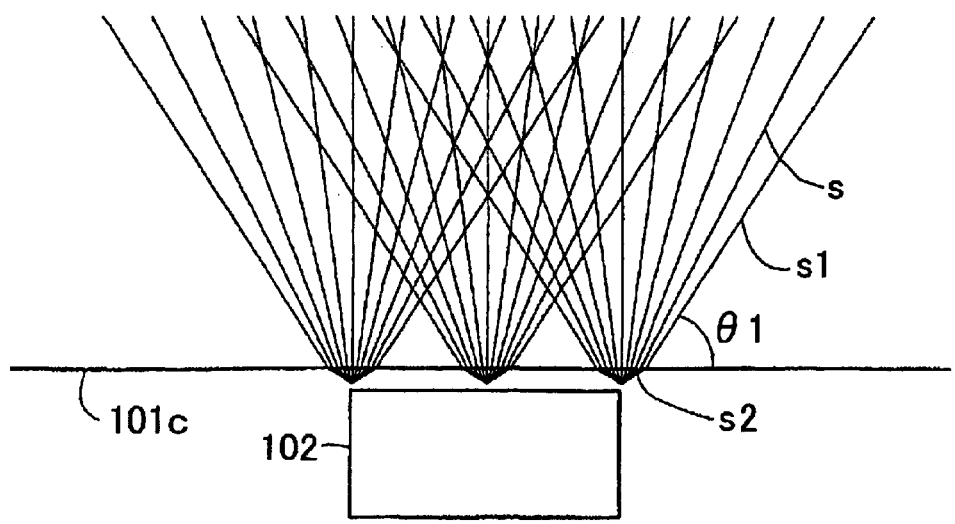
FIG. 13 is an enlarged plan view of a part of the lighting panel.
Figure 14:
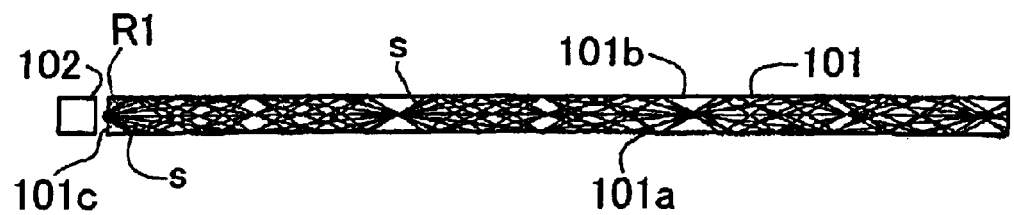
FIG. 14 is a side view of the lighting panel.

Referring to FIG. 5, light rays s passing through the innermost wall 3c enters lighting panel 1 at small angles of refraction because of a small incident angle. Light rays passing through the left and right arcuated walls 3f and 3g enter the light panel 1 at small angles of refraction in outward directions from normals. Light rays enter in outward directions from normals at larger angles of refraction through the left and right side walls 3d and 3e. More particularly, there is formed light rays s1 close to the front side 1c. Consequently, since the inclination angle θ1 between the outermost light ray and the front side 1c is small, there is formed small ineffective areas R as shown in FIG. 4. The ineffective area R is largely reduced compared with the ineffective area R shown in FIG. 12.

Figure 15:
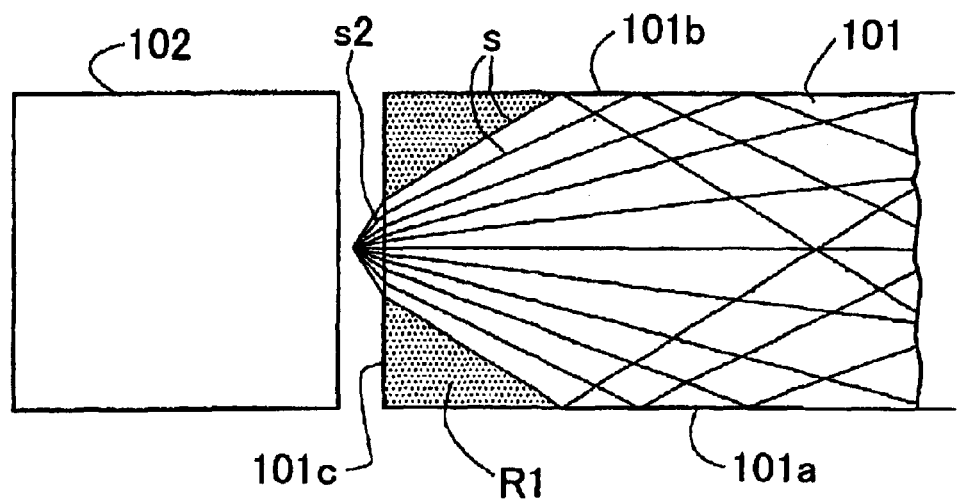
FIG. 15 is an enlarged side view of a part of the lighting panel.

As shown in FIG. 7 light rays S3 enter the lighting panel 1 through upper and lower walls 3h and 3i in outward directions from normals at large angles of refraction. Therefore, small ineffective areas R1 are formed, which are largely reduced compared with the areas R1 of FIG. 15.

In accordance with the present invention, light rays are widely diffused in the lighting panel, so that the display panel is uniformly illuminated.

While the invention has been described in conjunction with preferred specific embodiment thereof, it will be understood that this description is intended to illustrate and not limit the scope of the invention, which is defined by the following claims.

What is claimed is:

1. A display assembly comprising:

at least one light source;

a lighting panel made of a transparent resin;

the lighting panel having a front side disposed adjacent to the light source, a light discharge side, and a reflection side opposite to the light discharge side;

at least one refracting recess formed in the front side of the lighting panel disposed to receive light emitted from the light source;

the refracting recess having a sectional shape so as to cause the light to refract close to the front side in the lighting panel, wherein the at least one refracting recess has an opening, an innermost flat wall, a right side flat wall, and a left side flat wall, wherein the innermost flat wall has at least one round side.

2. The display assembly according to claim 1 wherein the light source is provided to radially emit the light in a horizontal direction and a vertical direction.

3. The display assembly according to claim 1, wherein two of the refracting recesses are disposed vertically in the front side of the lighting panel.

4. The display assembly according to claim 1, wherein a plurality of the refracting recesses are disposed in the front side of the lighting panel.

5. The display assembly according to claim 3, wherein a plurality of the refracting recesses are disposed in the front side of the lighting panel.

* * * * *